United States Patent
Wideman et al.

(12)
(10) Patent No.: US 6,329,455 B1
(45) Date of Patent: Dec. 11, 2001

(54) RUBBER COMPOSITIONS CONTAINING A DISODIUM SALT OF 3,3'-DITHIODIPROPIONIC ACID

(75) Inventors: Lawson Gibson Wideman, Hudson; Paul Harry Sandstrom, Tallmadge, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/426,330

(22) Filed: Oct. 25, 1999

(51) Int. Cl.[7] ............... C08K 3/30; C08K 3/32; B60C 11/00
(52) U.S. Cl. ............ 524/262; 524/392; 524/332; 524/493; 524/305; 524/419; 152/209.1
(58) Field of Search .................... 524/392, 332, 524/262, 492, 493, 304, 305, 419; 152/209.1

(56) References Cited

U.S. PATENT DOCUMENTS

| | | | |
|---|---|---|---|
| 3,732,174 | * 5/1973 | Nicholas | 260/2 A |
| 4,513,123 | 4/1985 | Day et al. | 525/332.6 |
| 5,130,363 | * 7/1992 | Scholl et al. | 524/392 |
| 5,328,949 | 7/1994 | Sandstrom et al. | 524/262 |
| 5,504,137 | 4/1996 | Sandstrom et al. | 525/492 |

FOREIGN PATENT DOCUMENTS

| | | | |
|---|---|---|---|
| 0632093 | 1/1995 | (EP) | C08K/5/37 |
| 0682067 | 11/1995 | (EP) | C08K/5/098 |
| 0780429 | 6/1997 | (EP) | C08K/5/372 |

* cited by examiner

Primary Examiner—Donald R. Wilson
Assistant Examiner—R. Harlan
(74) Attorney, Agent, or Firm—Bruce J. Hendricks

(57) ABSTRACT

The present invention relates to rubber compositions containing a disodium salt of 3,3'-dithiodipropionic acid.

19 Claims, No Drawings

RUBBER COMPOSITIONS CONTAINING A DISODIUM SALT OF 3,3'-DITHIODIPROPIONIC ACID

FIELD OF THE INVENTION

The present invention relates to a rubber composition containing a disodium salt of 3,3'-dithiodipropionic acid and the processing of a sulfur-curable rubber composition containing a disodium salt of 3,3'-dithiodipropionic acid.

BACKGROUND OF THE INVENTION

Processing aids are commonly used in both natural and synthetic rubber compositions. Such processing aids are used during the mixing, permitting incorporation of fillers and other ingredients rapidly with lower power consumption. In instances where the filler is silica, well-known sulfur containing organosilicon compounds are used to further assist in compatibilizing the silica in the rubber composition.

SUMMARY OF THE INVENTION

The present invention relates to the use of a disodium salt of 3,3'-dithiodipropionic acid in a sulfur vulcanizable rubber.

DETAILED DESCRIPTION OF THE INVENTION

There is disclosed a method for processing a rubber composition which comprises mixing
  (i) 100 parts by weight of at least one sulfur vulcanizable elastomer selected from conjugated diene homopolymers and copolymers and from copolymers of at least one conjugated diene and aromatic vinyl compound; with
  (ii) 0.05 to 10 phr of a disodium salt of 3,3'-dithiodipropionic acid.

There is also disclosed a rubber composition comprising an elastomer containing olefinic unsaturation and a disodium salt of 3,3'-dithiodipropionic acid.

The present invention may be used to process sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect, the rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content; namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 100° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, 10 or elastomer."

The disodium salt of 3,3'-dithiodipropionic acid used in the present invention may be prepared by adding 3,3'-dithiodipropionic acid to an aqueous solution of sodium hydrogen carbonate. Upon completion of the addition, the solid salt product is dried.

The disodium salt of 3,3'-dithiodipropionic acid used in the present invention may be added to the rubber by any conventional technique such as on a mill or in a Banbury. The amount of disodium salt of 3,3'-dithiodipropionic acid may vary widely depending on the type of rubber and other compounds present in the vulcanizable composition. Generally, the amount of disodium salt of 3,3'-dithiodipropionic acid is used in a range of from about 0.05 to about 10.0 phr with a range of 0.1 to about 5.0 phr being preferred. The disodium salt of 3,3'-dithiodipropionic acid may be added during the nonproductive stage or productive stage of mixing but is preferably added in the nonproductive stage.

For ease in handling, the disodium salt of 3,3'-dithiodipropionic acid may be used per se or may be deposited on suitable carriers. Examples of carriers which may be used in the present invention include silica, carbon black, alumina, kieselguhr, silica gel and calcium silicate.

In a preferred embodiment, the rubber composition contains a sufficient amount of silica, and carbon black, if used, to contribute a reasonably high modulus and high resistance to tear. The silica filler may be added in amounts ranging from 10 to 250 phr. Preferably, the silica is present in an amount ranging from 15 to 80 phr. If carbon black is also present, the amount of carbon black, if used, may vary. Generally speaking, the amount of carbon black will vary from 0 to 80 phr. Preferably, the amount of carbon black will range from 0 to 40 phr. It is to be appreciated that the disodium salt of 3,3'-dithiodipropionic acid may be used in conjunction with a carbon black; namely, pre-mixed with a carbon black prior to addition to the rubber composition, and such carbon black is to be included in the aforesaid amount of carbon black for the rubber composition formulation.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 5:1. The combined weight of the silica and carbon black, as herein referenced, may be as low as about 30 phr, but is preferably from about 45 to about 90 phr.

The commonly employed particulate precipitated silica used in rubber compounding applications can be used as the silica in this invention. These precipitated silicas include, for example, those obtained by the acidification of a soluble silicate; e.g., sodium silicate.

Such silicas might be characterized, for example, by having a BET surface area, as measured using nitrogen gas, preferably in the range of about 40 to bout 600, and more usually in a range of about 50 to bout 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Whereas the disodium salt of 3,3'-dithiodipropionic acid improves the properties of a silica-filled rubber composition, the processing of the sulfur vulcanizable rubber may be conducted in the presence of a sulfur containing organosilicon compound. Examples of suitable sulfur containing organosilicon compounds are of the formula:

Z—Alk—S$_n$—Alk—Z     (I)

in which Z is selected from the group consisting of

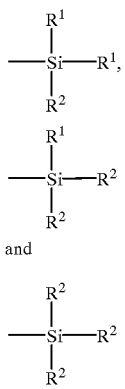

where R$^1$ is an alkyl group of 1 to 4 carbon atoms, cyclohexyl or phenyl;

R$^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3, '-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore, as to formula II, preferably Z is

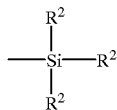

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of Formula I in a rubber composition will vary depending on the level of silica that is used. Generally speaking, the amount of the compound of Formula I, if used, will range from 0.01 to 1.0 parts by weight per part by weight of the silica. Preferably, the amount will range from 0.05 to 0.4 parts by weight per part by weight of the silica.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, are herein set forth. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

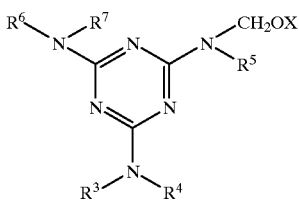

wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group—$CH_2OX$. Specific methylene donors include hexakis-(methoxymethyl)melamine, N,N',N"-trimethyl/N,N', N"-trimethylolmelamine, hexamethylolmelamine, N,N', N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that are present will range from about 0.1 phr to 10.0 phr. Preferably, the amount of methylene donor and methylene acceptor ranges from about 2.0 phr to 5.0 phr for each.

The weight ratio of methylene donor to the methylene acceptor may vary. Generally speaking, the weight ratio will range from about 1:10 to about 10:1. Preferably, the weight ratio ranges from about 1:3 to 3:1.

The mixing of the rubber composition can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica, disodium salt of 3,3'-dithiodipropionic acid and carbon black, if used, are mixed in one or more non-productive mix stages. The terms "non-productive" and "productive" mix stages are well known to those having skill in the rubber mixing art. The sulfur vulcanizable rubber composition containing the disodium salt of 3,3'-dithiodipropionic acid, vulcanizable rubber and generally at least part of the silica should, as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The invention may be better understood by reference to the following examples in which the parts and percentages are by weight unless otherwise indicated.

EXAMPLE 1

Preoaration of Disodium 3,3'-Dithiodipropionate

A 1-liter polypropylene beaker was charged with a solution of 42 g (0.50 mole) of sodium hydrogen carbonate in 100 g of distilled water, followed by the slow addition of 52.5 g (0.25 mole) of 3,3'-dithiodipropionic acid, which required about 10 minutes. The resulting paste was spread on an evaporating tray and dried. The salt product was white-colored and melted above 225° C.

EXAMPLE 2

In this example, the disodium salt of 3,3'-dithiodipropionic acid prepared in Example 1 was evaluated in comparison with a commercially-available silica coupling agent; namely, bis-(3-triethoxysilylpropyl)tetrasulfide.

Rubber compositions containing the materials set out in Tables I and II were prepared in a BR Banbury™ mixer using three separate stages of addition (mixing); namely, two non-productive mix stages and one productive mix stage. The first non-productive stage was mixed for up to 4 minutes or to a rubber temperature of 160° C. whichever occurred first. The second non-productive stage was mixed for 7 minutes at 160° C. The mixing time for the productive stage was to a rubber temperature of 120° C. for 2 minutes.

The rubber compositions are identified herein as Samples 1–3. Samples 1 and 2 are considered herein as being controls without the use of a disodium salt of 3,3'-dithiodipropionic acid added during the non-productive mixing stage.

The samples were cured at about 150° C. for about 36 minutes.

Table II illustrates the behavior and physical properties of the cured samples 1–3.

It is clearly evident from the results that the use of disodium salt of 3,3'-dithiodipropionic acid results in higher modulus, hardness properties (at room temperature and 100° C.) and higher rebound values than the sample where no silica coupler is present. The increased Modulus and hardness is expected to increase tire handling properties and tire durability. This is supported by E' (stiffness) at 60° C. The increase of rebound should provide improved rolling resistance and fuel economy. The lower DIN abrasion over the uncoupled control is historically related to improved treadwear in a tire.

TABLE I

|  | Ex. 1 | Ex. 2 | Ex. 3 |
|---|---|---|---|
| First Non-Productive |  |  |  |
| Polyisoprene[1] | 100 | 100 | 100 |
| Carbon Black | 35 | 35 | 35 |
| Processing Oil | 5 | 5 | 5 |
| Zinc Oxide | 5 | 5 | 5 |
| Fatty Acid | 2 | 2 | 2 |
| Antioxidant[2] | 2 | 2 | 2 |
| Second Non-Productive |  |  |  |
| 1st Non-Productive | 149 | 149 | 149 |
| Silica[3] | 15 | 15 | 15 |
| Silane Coupling Agent[4] | 0 | 3 | 0 |
| Disodium Salt of 3,3'-dithiodipropionic Acid[5] | 0 | 0 | 2 |
| Productive |  |  |  |
| Second Non-Productive | 164 | 167 | 166 |
| Sulfur | 1.4 | 1.4 | 1.4 |
| Accelerator[6] | 1 | 1 | 1 |

[1]Synthetic cis 1,4-polyisoprene which is commercially available from The Goodyear Tire & Rubber Company under the designation Natsyn ® 2200
[2]Polymerized 1,2-dihydro 2,2,4-trimethylquinoline type
[3]Precipitated silica which is commercially available from the PPG Company under the designation Hil Sil ™ 210
[4]Obtained as bis-(3-triethoxysilylpropyl) tetrasulfide, which is commercially available as X50S from Degussa Gmbh and is provided in a 50/50 by weight blend with carbon black.
[5]Prepared in Example 1.
[6]Sulfenamide type

TABLE II

| Samples | 1 | 2 | 3 |
|---|---|---|---|
| Bis-(3-triethoxysilylpropyl) tetrasulfide | 0 | 3 | 0 |
| Disodium salt of 3,3'-dithiodipropionic acid | 0 | 0 | 2 |
| Rheometer 150° C. |  |  |  |
| Delta Torque | 20.0 | 24.0 | 24.3 |
| T90 | 22.5 | 19.0 | 21.0 |
| Stress Strain 36' @ 150° C. |  |  |  |
| 100% M (MPa) | 1.13 | 1.69 | 1.55 |
| 300% M (MPa) | 5.33 | 8.33 | 6.95 |
| Tensile Strength (MPa) | 17.0 | 19.6 | 18.2 |
| Elongation @ Break (%) | 627 | 581 | 586 |
| Hardness |  |  |  |
| RT | 48.1 | 55.6 | 53.8 |
| 100 C. | 47.0 | 54.3 | 52.5 |
| Rebound |  |  |  |
| RT | 45.8 | 49.3 | 50.7 |
| 100 C. | 59.0 | 62.4 | 63.1 |
| E', 60° C., (MPa) | 7.6 | 10.5 | 11.4 |

TABLE II-continued

| Samples | 1 | 2 | 3 |
|---|---|---|---|
| Tan Delta | 0.110 | 0.101 | 0.090 |
| DIN Abrasion (lower is better) | 225 | 133 | 179 |

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition which comprises mixing
   (i) 100 parts by weight of at least one sulfur vulcanizable elastomer selected from the group consisting of natural rubber, conjugated diene homopolymers and copolymers and from copolymers of at least one conjugated diene and aromatic vinyl compound; with
   (ii) 0.05 to 10 phr of a disodium salt of 3,3'-dithiodipropionic acid.

2. The method of claim 1 wherein said disodium salt of 3,3'-dithiodipropionic acid is added in an amount ranging from 0.10 to 5.0 phr.

3. The method of claim 1 wherein from 10 to 250 phr of a particulate precipitated silica is present.

4. The method of claim 3 wherein a sulfur containing organosilicon compound is present and is of the formula:

$$Z-Alk-S_n-Alk-Z \quad \text{I}$$

in which Z is selected from the group consisting of

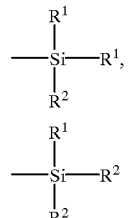

and

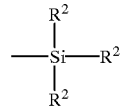

where $R^1$ is an alkyl group of 1 to 4 carbon atoms, cyclohexyl or phenyl;
$R^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8.

5. The method of claim 4 wherein said sulfur containing organosilicon compound is present in an amount ranging from 0.01 to 1.0 parts by weight per part by weight of the silica.

6. The method of claim 3 wherein a silica filler is added to said vulcanizable rubber composition in an amount ranging from 15 to 80 phr.

7. The method of claim 1 wherein said sulfur vulcanizable elastomer is selected from the group consisting of natural rubber, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

8. The method of claim 1 wherein said rubber composition is thermomechanically mixed at a rubber temperature in a range of from 140° C. to 190° C. for a mixing time of from 1 to 20 minutes.

9. A sulfur vulcanizable rubber composition comprising (i) an elastomer selected from the group consisting of natural rubber, conjugated diene homopolymers and copolymers and from copolymers of at least one conjugated diene and aromatic vinyl compound; and (ii) a disodium salt of 3,3'-dithiodipropionic acid.

10. The composition of claim 9 wherein said disodium salt of 3,3'-dithiodipropionic acid is present in an amount ranging from 0.05 to 10.0 phr.

11. The composition of claim 9 wherein from 10 to 250 phr of a particulate precipitated silica is present.

12. The composition of claim 11 wherein a sulfur containing organosilicon compound is present and is of the formula:

$$Z-Alk-S_n-Alk-Z \qquad I$$

in which Z is selected from the group consisting of

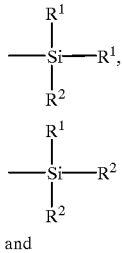

and

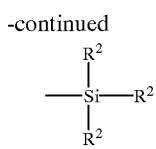

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

13. The composition of claim 12 wherein said sulfur containing organosilicon compound is present in an amount ranging from 0.01 to 1.0 parts by weight per part by weight of said silica.

14. The composition of claim 11 wherein a silica filler is used in an amount ranging from 15 to 80 phr.

15. The composition of claim 9 wherein said elastomer is selected from the group consisting of natural rubber, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

16. The composition of claim 9 wherein said composition is thermomechanically mixed at a rubber temperature in a range of from 140° C. to 190° C. for a total mixing time of from 1 to 20 minutes.

17. A sulfur vulcanized rubber composition which is prepared by heating the composition of claim 9 to a temperature ranging from 100° C. to 200° C. in the presence of a sulfur vulcanizing agent.

18. The sulfur vulcanized rubber composition of claim 17 in the form of a tire, belt or hose.

19. A tire having a tread comprised of the composition of claim 17.

* * * * *